Dec. 30, 1952  A. COQUILLE  2,623,765
BALANCED COTTER
Filed Dec. 12, 1946
2 SHEETS—SHEET 1
FIG. 1
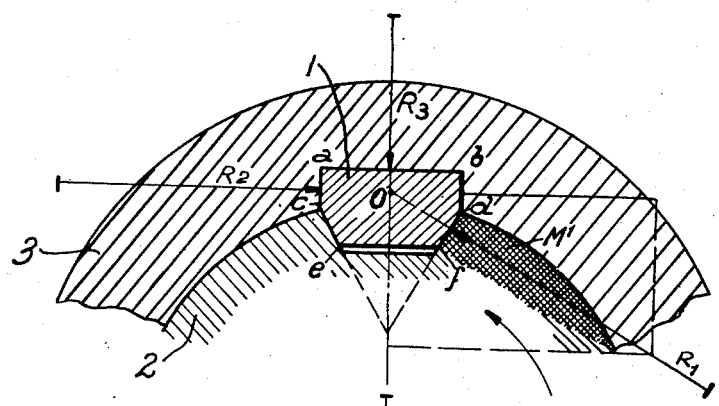
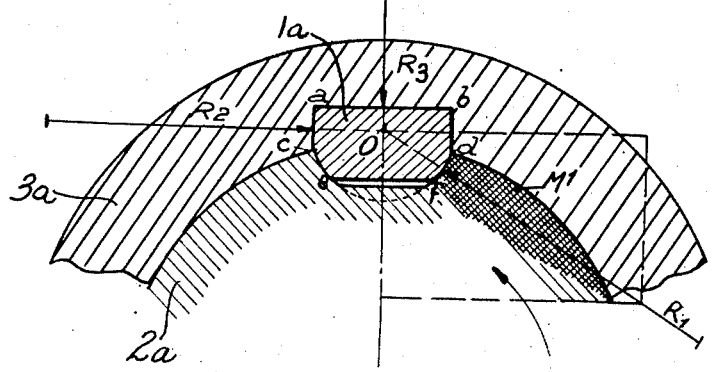
FIG. 2
INVENTOR
ALEXANDRE COQUILLE
BY: Young, Emery & Thompson
ATTYS- Dec. 30, 1952  A. COQUILLE  2,623,765
BALANCED COTTER
Filed Dec. 12, 1946  2 SHEETS—SHEET 2
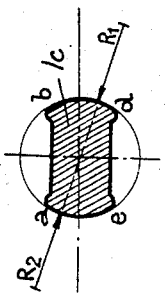
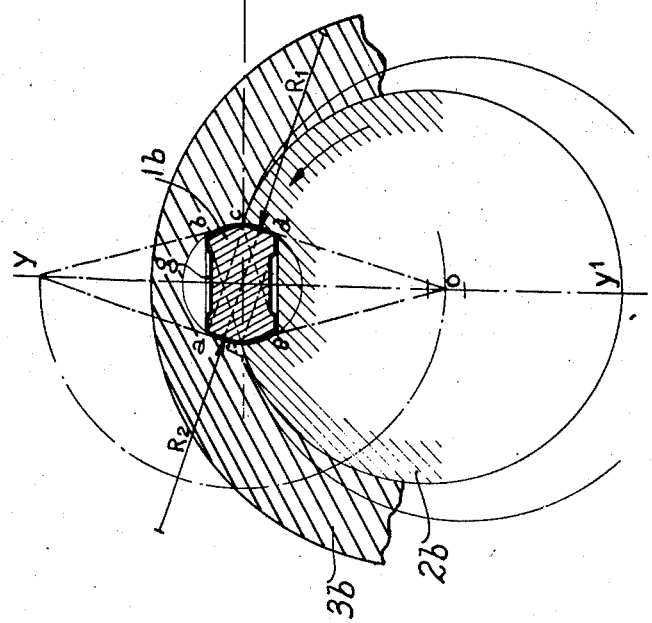
INVENTOR
ALEXANDRE COQUILLE
By Young, Emery & Thompson
ATTYS- Patented Dec. 30, 1952

2,623,765

UNITED STATES PATENT OFFICE 2,623,765

BALANCED COTTER

Alexandre Coquille, Syam, France, assignor to Societe Anonyme dite: Forges De Syam, Syam (Jura), France, a corporation of France Application December 12, 1946, Serial No. 715,741 In France March 9, 1945

Section 1, Public Law 690, August 8, 1946 Patent expires March 9, 1965

4 Claims. (Cl. 287—52.05)

It is a well known fact that keying of hubs on transmission shafts is generally effected by means of keys of rectangular cross-section fitted half in the grooves of the hub and half in the grooves of the shaft. When the keying is effected with the required accuracy, the reactions due to the transmission of a rotary movement are exerted principally on the lateral sides and in the case of a moderate fastening, the operation is a satisfactory one; but if the keying is somewhat defective in its fitting, the very high transmission reactions produce deformations which amplify the vibrations and may be prejudicial to the reliability of operation.

The present invention has for its object a key connection chiefly intended for removing such drawbacks.

The key of some forms of the invention has a cross-section which is symmetrical with reference to the diametrical plane passing through the center of gravity, while two apices of the polygon lie necessarily at the periphery of the shaft. Moreover, to prevent any rotation of the key, its outline is defined in a manner such that all the reactions converge and pass through the middle of its side surfaces. The strains are thus uniformly distributed, which avoids any upsetting in the vicinity of the edge of the side surfaces, and the equilibrium in both directions of operation will be perfect with a single key which may be termed therefore a balanced key.

In other forms of the invention, the keys are shaped similarly to those of the aforesaid keys, but differ therefrom in that some of the side surfaces are in the form of arcs of a cylinder instead of plane surfaces.

Various forms of construction of a key answering the above conditions are illustrated by way of example in the accompanying drawings.

In the drawings:

Figure 1 is a diagrammatic cross-sectional view of a shaft and hub keyed together according to the present invention;

Fig. 2 is a similar view showing a modified form of the invention;

Fig. 3 is another similar view showing a further modified form of the invention;

Fig. 4 is another view similar to Fig. 1, showing a further modified form of invention.

Referring to Figure 1, the cross section of the key $1$ has the shape of a polygon $a$—$b$—$c$—$d$—$e$—$f$—, the apices $c$ and $d$ of which are located respectively on corresponding generating lines or surfaces of the shaft $2$.

As shown in Figure 1, the keyway in the shaft $2$ has two sides of equal dimensions corresponding to the lower lateral sides $c, e$ and $d, f$ of the key but slightly wider, and a bottom spaced from the bottom $ef$ of the key. The keyway in the hub $3$ has two sides of equal dimensions corresponding to the upper lateral sides $a, c$ and $b, d$ of the key $1$ and a bottom corresponding to the top of the key.

In the structure shown in Figure 2, the lower lateral sides $c, e$ and $d, f$ of the key $1a$ are in the form of cylindrical arcs whereas the bottom is a plane surface. The keyway in the shaft $2a$ is formed with two sides in the form of arcs of a cylinder corresponding to the sides of the key $1a$.

In both cases, the reactions $R1$, $R2$, $R3$, pass actually through the same point $0$ and their corresponding application points lie in the middle of the lateral sides of the key and keyways through which they are exerted, the resultant force being zero whatever the direction of operation may be. Static equilibrium is always obtained in a satisfactory manner without any localized upsetting in the vicinity of the edges of the lateral sides, while an important fraction $M1$ of the cross-section of the shaft plays a part in the transmission of the rotary movement through the agency of the reaction $R1$.

In contradistinction with the operation of ordinary keys, the machining allowances have no action on the value of the transmission reaction and such keys even when they are free behave as well as if they were inserted with considerable friction; in particular, the transmission reaction on the bottom of the groove of the hub does not risk reaching an exaggerated value.

The outline illustrated in Fig. 2 has for its further advantage the effecting of a perfect keying, even when the keyway in the hub is slightly oblique; as a matter of fact, the cylindrical surfaces of the sides of the keyway of the shaft corrects any lack of perpendicularity and allows the key to be properly set angularly in both keyways.

The key $1b$ illustrated in Figure 3, which corresponds in practice to the normal key of 24 x 14 mm. for a shaft of 78 to 82 mm. in diameter, answers also the general above disclosed definition, but it shows a further feature consisting in that its polygonal outline is such that the transmission reactions are reduced to two forces which are equal and directly opposed and are exerted only on the surfaces of the lateral sides of the keyways provided in the shaft and in the hub to be assembled thereto.

As a matter of fact, the apices of the polygons $a$—$b$—$c$—$d$—$e$—$f$ are all arranged on a circumference having as a diameter $fc$, whereby the apices $a$ and $b$ are symmetrical with the apices $e$, $d$ with reference to the axial line $f$, $c$. The reactions due to the forces $R_1$ and $R_2$ are thus aligned along a common axis and consequently, compensate one another without any reaction being exerted on the bottom of the keyway in the shaft or in the hub.

When the meeting line of the extensions of the lateral surfaces $cd$ and $fe$ coincides with the longitudinal axis of the shaft as shown in Fig. 3 where this line passes through the center $0$ of the shaft having 80 mms. in diameter, the key may be considered as formed by two tangent keys, $acdf$ on one hand and $bfec$ on the other, arranged symmetrically and formed into one and it actually constitutes thereby a double tangent key.

It should be noted that the key $1b$ illustrated in Fig. 3 has no play in the bottom of the keyway and this figure is supposed to show a fastened key bearing principally through its lateral sides while the bottoms of the grooves are adjusted with a slight friction, the adjustment of which may moreover be furthered by providing a recess $g$ in each corresponding surface of the key. Even if the key is of the sliding type, a slight play should be allowed in the groove of the part, whether the hub or the shaft, which is to slide on the other part to which the key is held fast.

By doing away with all reactions on the bottoms of the grooves, the above disclosed modifications provide a substantial advantage for sliding keys such as those used for the spindles of reaming machines, because the screws securing the key inside one of the keyway grooves are no longer submitted to any stress.

Fig. 4 shows merely by way of a modification a key $1c$, the characteristic features of which are the same as those of the key of the preceding example, except for the fact that the lateral plane surfaces of Fig. 3, $bc$, $cd$, $ef$, $fa$ are replaced by corresponding arcs of a circumference inside which is inscribed the outline $abde$ of the key $1c$ which forms thus in practice a double tangent key with cylindrical bearings.

What I claim is:

1. The combination with a shaft and a hub mounted thereon, each having an axially extending keyway, the keyway in the shaft having two sides of equal width and similar contour and a bottom of a width different from that of the sides, the keyway in the hub having two sides of equal width and a bottom of a width different from that of the sides, a key having two lower lateral sides corresponding to the sides of the keyway of the shaft, two upper lateral sides corresponding to the sides of the keyway of the hub, a top side corresponding to the bottom of the hub keyway and a bottom side corresponding to the bottom of the shaft keyway, the adjacent lateral edges of the upper and lower lateral sides of the key coinciding and forming apices lying on the circumferential surface of the shaft, said key being fitted into said keyway, with the upper lateral sides of the key engaging the lateral sides of the hub keyway and with the lower lateral sides of the key engaging the sides of the shaft keyway, all of the longitudinal axially extending edges of both upper and both lower lateral sides of the key lying on the surface of a single imaginary cylinder.

2. A combination as claimed in claim 1 in which one of said keyways and the corresponding portion of the key are rectangular in cross section.

3. A combination as claimed in claim 1 in which the sides of one of said keyways and the corresponding sides of the key are portions of a cylindrical surface coinciding with the surface of said imaginary cylinder.

4. A combination as claimed in claim 1 in which the sides of both said keyways and the corresponding sides of the key are portions of a cylindrical surface coinciding with the surface of said imaginary cylinder.

ALEXANDRE COQUILLE.

REFERENCES CITED

The following references are of record in the file of this patent:

UNITED STATES PATENTS

| Number | Name | Date |
|---|---|---|
| 408,835 | Grafton | Aug. 13, 1889 |
| 423,701 | Roemmele | Mar. 18, 1890 |
| 1,405,719 | Reaves | Feb. 7, 1922 |

FOREIGN PATENTS

| Number | Country | Date |
|---|---|---|
| 25,620 | Great Britain | Nov. 8, 1912 |
| 357,967 | France | Jan. 22, 1906 |
| 532,408 | Germany | Aug. 27, 1931 |

OTHER REFERENCES

Mathematical Dictionary of Davies & Peck, published by A. S. Barnes and Co., New York, 1856. (Copy in Pat. Office Scientific Library.)